United States Patent [19]

Ohr

[11] 4,226,624

[45] Oct. 7, 1980

[54] SOLUBILIZATION OF HEXAVALENT CHROMIUM COMPOUNDS IN ORGANIC MATERIALS

[75] Inventor: Jack Ohr, Miami Beach, Fla.

[73] Assignee: The United States of America as represented by the Secretary of the Navy, Washington, D.C.

[21] Appl. No.: 937,670

[22] Filed: Aug. 28, 1978

[51] Int. Cl.³ .............................................. C09D 5/08
[52] U.S. Cl. ............................. 106/14.05; 106/14.31; 106/14.37; 106/14.44; 252/390
[58] Field of Search ............... 106/14.31, 14.05, 14.44, 106/14.37; 148/6.2; 252/148, 389 R, 390; 134/38

[56] References Cited

U.S. PATENT DOCUMENTS

| | | | |
|---|---|---|---|
| 2,607,744 | 8/1952 | Niles | 252/389 R |
| 3,384,590 | 5/1968 | Eversole et al. | 252/390 |
| 3,598,616 | 8/1971 | Moorehouse et al. | 106/14.23 |
| 3,719,534 | 3/1973 | Vessey et al. | 148/6.2 |
| 3,839,097 | 10/1974 | Hall et al. | 148/6.2 |

OTHER PUBLICATIONS

Starks et al., *Phase Transfer Catalysis: Principles and Techniques*, 1978, pp. 302, 303 and 327.

*Primary Examiner*—Lorenzo B. Hayes
*Attorney, Agent, or Firm*—R. S. Sciascia; Henry Hansen; Stanton D. Weinstein

[57] ABSTRACT

Method and composition utilizing organo substituted quaternary ammonium salts to effect the solution of hexavalent chromium into organic materials such as paints, in which such inhibitors are normally insoluble, in order to upgrade the corrosion protection properties of these materials. A quantity of organo substituted quaternary ammonium salt is dissolved in organic material. A quantity of simple alkali metal chromate or dichromate is then mixed with the resulting solution and is dissolved therein.

13 Claims, No Drawings

SOLUBILIZATION OF HEXAVALENT CHROMIUM COMPOUNDS IN ORGANIC MATERIALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to compositions and methods wherein a compound is dissolved in organic material.

Metallic structures utilizing metals such as aluminum, steel, magnesium or other metals used in aircraft are subject to corrosion such as from sea water, resulting in substantial expense in replacing or repairing corroded parts. The anions of inorganic salts such as chromates are highly effective corrossion inhibitors for these metals. However, these substances are not soluble in liquid and solid organic media or materials such paints or plastics. Consequently, such materials contain inferior organic inhibitors, or contain inorganic salts in the less effective dispersed as opposed to dissolved condition, or else do not contain any corrosion inhibiting materials. If these salts were soluble in those organic media associated with protective coatings and lubricants, their protective effect would be thereby significantly increased. Also, corrosion protective primers containing dispersed chromate cannot be used without a topcoat since the large amount of dispersed chromate pigment required for effective corrosion protection makes the primer in unsightly green. Macrocyclic crown polyethers have been utilized in a two-phase process to effect the solution of chromate anions into certain organic media, as disclosed by U.S. Pat. No. 3,929,521 to J. Ohr and K. G. Clark, but the macrocyclic crown polyethers are very expensive.

SUMMARY OF THE INVENTION

Accordingly, it is a general purpose of the present invention to provide a method for dissolving, and a composition wherein there has been dissolved, inorganic salts into organic materials.

Other objects of the present invention are an inexpensive and easily utilized process for dissolving inorganic corrosion inhibitor into organic material without requiring two separate phases, capable of dissolving inorganic salts in organic media less polar than paints such as lubricants, utilizing inexpensive and readily available materials, capable of solubilizing and providing even distribution of chromate salts in organic materials, capable of providing improved corrosion inhibition properties to coating compositions, providing a fast, inexpensive, easily utilized and effective method of dissolving the highly effective chromate and dichromate corrosion inhibitors into relatively nonpolar or low polar liquid organic materials such as paints in which they are ordinarily insoluble, capable of improving corrosion protection provided by organic-based coating materials and lubricating fluids, significantly upgrading the corrosion inhibition performance of many diverse liquid organic materials, and providing move effective solubilization.

Further objects of the present invention are to provide a coating composition capable of being applied to and of providing corrosion protection to metallic structures which requires only relatively minute quantities of corrosion inhibitive material, which requires less corrosion inhibitive material than would otherwise be necessary, is capable of providing a primerless topcoat, can combine the advantages of topcoat and primer in a single coating, is capable of reducing material requirements, cost and man-hours by eliminating the need for primer in the finishing of metal structures such as in aircraft, capable of providing even distribution of corrosion inhibitive material therein and in an applied coating, and wherein negligible color from corrosion inhibiting materials is imparted to a clear paint vehicle or to a pigmented paint.

Still further objects of the present invention are to provide a process for providing corrosion protection to metal surfaces which is inexpensive and easily utilized.

Briefly, these and other objects of the invention are accomplished by an organic solution of an inorganic salt prepared by mixing an amount of organo-substituted quaternary ammonium salt in organic material, and then mixing a quantity of the inorganic salt therein. One example of such a quarternary salt is methyltrialkyl ($C_8$–$C_{10}$) ammonium chloride. Because the inorganic salt is thereby dissolved in the organic material, the inorganic salt is evenly distributed in a continuous gradient throughout the entire thickness of applied coating.

Other objects, advantages and novel features of the present invention will become apparent from the following detailed description thereof.

DESCRIPTION OF THE PREFERRED EMBODIMENT

In the invention, organo substituted quaternary ammonium salt is employed to dissolve inorganic salts into organic media. An amount of an organo-substituted quaternary ammonium salt is mixed with an organic material, and then a quantity of an inorganic salt is mixed therewith to form an organic solution of the inorganic salt. The quaternary salt reacts with the inorganic salt, resulting in solution of the inorganic salt in the organic media as described by the following equations:

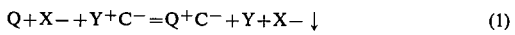

$$Q^+X^- + Y^+C^- = Q^+C^- + Y^+X^- \downarrow \qquad (1)$$

or

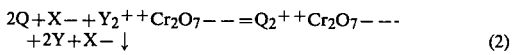

$$2Q^+X^- + Y_2^{++}Cr_2O_7^{--} = Q_2^{++}Cr_2O_7^{--} + 2Y^+X^- \downarrow \qquad (2)$$

where $Q^+X^-$ is the quaternary salt, and $Y^+C^-$ is the inorganic salt where Y is the cation such as potassium, and C is the anion such as dichromate ($Cr_2O_7$). Secondary point $Y+X-$ should be inert and may precipitate out. The produced solution can then be added to a particular coating or other material is desired. One such quaternary salt is methyltrialkyl ($C_8$ to $C_{10}$) ammonium chloride, which is preferred. At least one part inorganic salt should be added to the organic material for every ten parts by weight of quaternary salt; preferably, equal parts by weight of inorganic salt and of quaternary salt should be so utilized. No reagent need be added, nor is a second, aqueous phase necessary.

The following specific examples are intended to illustrate the invention but not to limit it in any way:

EXAMPLE 1

To fortify organic based paints with active dichromate or chromate ions, first dissolve in appropriate thinner for the paint an amount of organo-substituted ammonium quaternary salt corresponding to from 1.0% to 20% of the paint nonvolatile film-forming vehicle solids by weight. Add to this solution the same weight of alkali metal dichromate or chromate as the weight of quaternary salt already added. Stir this mixture vigorously for a few seconds every five minutes for at least one-half hour. The clear solution should now have a distinct yellow, yellow-orange or orange color, indicating the presence of chromate anion or dichromate anion. The color can be yellow-orange, more yellow with chromate and more orange with dichromate, or it can be yellow or orange. Decant or strain the supernatent clear solution from the undissolved chromate or dichromate. To instantly impart effective corrosion inhibiting properties to paint or enamel, merely thin the paint with this modified thinner in the conventional thinning procedure and apply the paint by any conventional means. For many applications, this modified paint as a topcoat will have sufficient corrosion protection properties so that it may be applied directly over a steel or aluminum substrate without requiring previous application of paint primer. Several of the organo-substituted ammonium quaternary salts can solubilize the hexavalent chromium anions into organic media. Benzyltriethylammonium bromide and benzyltriethylammonium chloride can solubilize the hexavalent chromium anion into chlorinated organic solvents. The combination found to be the most versatile and most effective, and which is preferred, includes methyltrialkyl ($C_8$–$C_{10}$) ammonium chloride, and the alkali metal chromates or dichromates. The alkali metal dichromates are more effective, and are preferred. This combination can be used in organic nonpolar liquids as diverse as benzene, toluene, and chlorinated solvents, mineral spirits, aromatic naphtha, and hexane.

EXAMPLE 2

To every 10 ml. of a 0.25 molar solution of methyltrialkyl ($C_8$–$C_{10}$) ammonium chloride or other appropriate organo substituted quaternary ammonium salt in aliphatic or aromatic alkyd paint thinner, add 0.0034 moles or 1.0 gram of potassium dichromate (or the same amount of moles of alkali metal chromate or dichromate salt) and agitate vigorously for several seconds. Allow to settle and pour off the resulting clear supernatant solution colored as in Example 1 and containing the potent hexavalent chromium corrosion inhibitor. Mix 10 ml. of this solution with every 100 ml. of thinner. To instantly impart effective corrosion inhibiting properties to alkyd enamel, merely thin the paint with the modified thinner in a conventional thinning procedure and apply the paint conventionally. For many applications, this modified paint topcoat will have sufficient corrosion protection properties so that it may be applied directly over a steel or aluminum substrate without requiring previous application of paint primer.

EXAMPLE 3

A 0.05 to 2.0 molar solution of organo substituted quaternary ammonium salt such as an appropriate phase transfer catalyst is prepared by adding the quaternary salt to organic solvent and stirring to solution. With methyltrialkyl ($C_8$–$C_{10}$) ammonium chloride, these molar solution limits correspond to 223 mg. (0.0005 moles) and 892 mg. (0.002 moles), respectively. Solid potassium dichromate is then added to this solution in an amount corresponding to twice the number of moles of quaternary salt in solution. This mixture is shaken briskly for a few seconds every five minutes for about 20 minutes. At the end of this time, the water-white solvent will have assumed a definite orange or yellow-orange coloration due to the dissolution of the dichromate into the organic solvent. This clear solution containing the dichromate anion is decanted or filtered from the undissolved salt sediment.

EXAMPLE 4

446 mg. ±5% of one of three organo substituted quaternary ammonium salts is added to and stirred into 10.0 ml. of each of the following liquid organic solvents, and examined for compatibility: hexane, methylene dichloride, mineral spirits, aromatic naphtha and toluene. If the quaternary salt is soluble in a particular solvent, 588 mg. ±5% of powdered potassium dichromate is added to the solution with stirring for thirty seconds. Brisk agitation for thirty seconds is repeated every five minutes for twenty minutes. The undissolved dichromate salt is then permitted to settle until a clear solution ensues which is decanted, leaving the dichromate salt settlement at the bottom. The intensity of the color of this clear solution is then compared visually with the color of a control, which is a combination of 446 mg. of methyltrialkyl ($C_8$–$C_{10}$) ammonium chloride, 10.0 ml. toluene and 588 mg. potassium dichromate ($K_2Cr_2O_7$). A dichromate solution having the same color as the control indicates that approximately the same amount of dichromate as with the control is dissolved. In this manner, some qualitative idea is had of the amount of dichromate that has dissolved in the organic media, that is the efficacy of the quaternary salt tested in promoting the solubilization of dichromate. Methyltrialkyl ($C_8$–$C_{10}$) ammonium chloride is soluble in and produces a solution with dichromate having the same color as the control with, each of the above solvents. Benzyltriethylammonium bromide and benzyltriethylammonium chloride are each soluble in methylene dichloride, and each produces a solution therewith with dichromate having the same color as the control, but are not soluble in the other above solvents.

EXAMPLE 5

For a quantitative determination of dichromate solubilization, about 446 mg. (0.001 moles) of methyltrialkyl ($C_8$–$C_{10}$) ammonium chloride is dissolved in 10.0 ml solvent (0.1 M in quaternary salt) and about 588 mg. (0.002 mole) of potassium dichromate is then added (0.2 M in dichromate) and agitated as in Example 4. The resulting mixture of clear orange (or yellow-orange or yellow) solution and undissolved chromate is then filtered by suction on a fine sintered tared glass funnel. The undissolved dichromate salt residue on the funnel is washed three times with the solvent used in the solution and then once with methylethyl ketone. The filter is then dried at 100° C. for one hours, cooled and weighted. The amount of chromate considered to have been solubilized with the aid of quaternary salt is the difference between the weight of the residue and the weight of dichromate salt originally added, minus the weight of potassium chloride formed by metastasis. In mineral spirits, in two experiments in each of which 446 mg. quaternary salt and 589 mg. dichromate are added to mineral spirits, the weight of the residual dichromate is 574 mg. and 580 mg. respectively. For two tests in each of which 445 mg. of quaternary salt and 588 mg. of dichromate are added to toluene, the weight of residual undissolved dichromate is 573 mg. and 576 mg. respectively, for each test.

EXAMPLE 6

A solution containing dichromate anion is prepared as in Example 3 with methyltrialkyl ($C_8$–$C_{10}$) ammonium chloride to a concentration of 0.1 Molar (446 mg. or 0.001 moles per 10.0 ml. of solution) and potassium dichromate to a concentration of 0.2 Molar (588 mg. or 0.002 moles per 10 ml. of solution). The clear solution assumes a definite coloration as described in Example 1 due to the dissolution of dichromate salt into the organic media. The combination of methyltrialkyl ($C_8$–$C_{10}$) ammonium chloride and potassium dichromate is soluble in a wide range of organic liquid media including aliphatic and aromatic naphtha solvents such as hexane, chlorinated aliphatic solvents, ester solvents, ketone solvents, MIL-H-5606 petroleum base hydraulic fluid, halogenated hydrocarbon lubricating oils, diester lubricating oils and MIL-L-23699 ester turbine engine oil.

EXAMPLE 7

The combination of Example 5 is made with mineral spirits as the organic material, but with the amount of quaternary salt increased to 0.3 M and the amount of potassium dichromate increased to 0.6 M. This threefold increase in the amounts of quaternary salt and dichromate salt used produces almost five times the amount of soluble dichromate, specifically 72 mg. soluble dichromate per 10 ml of solution, compared with the 15 mg. soluble dichromate per 10 ml. of mineral spirits of Example 5.

EXAMPLE 8

The solution of Example 6, with mineral spirits as the organic material, is used to thin MIL-E-5557 alkyd enamel to brushing consistency: two parts by volume enamel to one part by volume solution. When this enamel modified with dissolved chromate and an unmodified MIL-E-5557 enamel are each applied without primer by brushing in two coats to dry film thickness of 1.0±0.2 mil to previously cleaned specimens of 10/20 steel and of 7075 aluminum which are then subjected to four months of 5% salt spray tests, the specimens painted with the modified enamel exhibit substantially less corrosion than do the control specimens coated with the unmodified control enamel.

EXAMPLE 9

A white epoxy primer paint is prepared according to MIL-P-23377 except that $TiO_2$ is substituted for the strontium chromate on a volume basis, giving the coating composition shown in Table I:

TABLE I

| | WT. % |
|---|---|
| COMPONENT A | |
| epoxy resin having an epoxide equivalent in the range of 450 to 600 | 18.2 |
| $TiO_2$ | 14.3 |
| silica | 2.9 |
| magnesium silicate | 5.5 |
| methyl isobutyl ketone | 12.6 |
| toluene | 6.5 |
| COMPONENT B | |
| polyamide resin having an amine value of 238 | 7.5 |
| toluene | 15.1 |
| isopropanol | 8.6 |
| n-butanol | 8.8 |

For the control, equal volumes of Component A, Component B and a mixture of equal volume of methyl isobutyl ketone and toluene and mixed to produce the primer. For the experimental coating composition, to every 100 ml of the MIBK/toluene thinner component is added first 4.46 grams methyltrialkyl ($C_8$–$C_{10}$) ammonium chloride and then 5.88 grams potassium dichromate with repeated brisk agitation for twenty minutes as in Example 6, with filtering out of the undissolved dichromate. The control composition and the experimental composition were each applied by spray to a cleaned bare flat 10/20 steel specimen, in dry film thicknesses of 0.8±0.2 mil. After five months in 5% salt spray, the specimen coated with the experimental coating exhibits substantially less corrosion than does the control specimen.

EXAMPLE 10

200 mg. of tetra-n-butylammonium iodide is dissolved in 3 ml. of chloroform. This solution is then mixed with a 3 ml. aqueous solution of 200 mg. of potassium dichromate. The chloroform solution exhibits the color change of Example 1, indicating the presence therein of dissolved dichromate.

It should be understood that sodium chromate, sodium dichromate, potassium chromate and potassium dichromate can be dissolved in organic media according to the present invention. Any other alkali, metal chromate or dichromate should also be so solubilizable. A resulting coating composition can be applied to other metals than steel and aluminum, such as magnesium. Other inorganic salts such as molybdates and tungstates which are also corrosion inhibitors and which appear in periodic table group IV, as does chromium, possibly should be similarly solubilizable in organic materials. Organo-substituted quaternary ammonium salt possibly should improve the corrosion inhibition properties of certain organic compounds such as the triazoles by deprotonation (pulling off a H+) thereof in solubilization.

Thus there has been shown a novel solubilization of inorganic salts in organic media. The quaternary salts required for such solubilization are relatively inexpensive and readily produced. Dissolving inorganic salts such as chromate in organic media improves its corrosion protection properties, since only with dissolved chromate will the anion exist free without a solvation shell, as is not the case in water. It follows that the chromate will be more active in organic media than in water, with a commensurate improvement in corrosion protection properties. Also, a coating composition produced according to the present invention could eliminate the need for separate primer and topcoat coatings such as is presently required for aircraft. The main function of a primer is to provide corrosion protection, while the topcoat satisfies aesthetic and camouflage needs. Previous primers utilizing chromates for corrosion protection could not be used without a topcoat since the large amounts of chromate pigment required to be disbursed therein made the primer an unsightly green. By dissolving chromate in the same paint vehicle, only relatively minute quantities of dissolved chromate are required to afford a equivalent degree of corrosion protection as would be provided by large amounts of dispersed chromate. This is because the dissolved chromate is evenly distributed in a continuous gradient throughout the entire thickness of coating to provide continuous protection, whereas dispersed chromate exists in discrete particle agglomerates with areas of limited protection therebetween. The small amounts of dissolved chromate necessary to provide corrosion protection import negligible color to a clear paint vehicle or particularly to a pigmented paint. The small amounts of chromate could be dissolved directly into a finished topcoat paint with the aid of quaternary ammonium salts, thereby converting it to a primerless topcoat, combining the advantages of topcoat and primer into a single coating. By eliminating the need for primer in metal finishing, extensive savings in material, costs and manhours can result. Organo substituted quaternary ammonium salts are superior to macrocyclic crown polyethers in effecting solubilization of chromates in organic media less polar than points, such as fuels, lubricants or adhesives.

For further information see Hutchins, R. O., Natale, N. R., Cook, W. J., and Ohr, J., *Orange Benzene. Neutral Dichomate Oxidations in Organic Solvents.* Abstract ORGN 166. In Proceedings of the 174th American Chemical Society National Meeting, Division of Organic Chemistry abstracts, Chicago, Illinois, Aug. 29–Sept. 2, 1977; and Hutchins, R. O., Natale, N. R., Cook, W. J. and Ohr, J. *Orange Benzene. Neutral Dichromate Oxidations in Organic Solvents.* The Tetrahedron Letters, No. 48: p. 4167–4170 Nov., 1977.

Obviously, many modifications and variations of the present invention are possible in light of the above teachings. It is therefore to be understood that within the scope of the appended claims the invention may be practiced otherwise than as specifically described.

What is claimed is:

1. A method for dissolving an inorganic alkali metal salt in a liquid organic material comprising:
   dissolving an effective amount of an organo substituted quaternary ammonium salt in said liquid organic material to form a first solution; and
   mixing an effective amount of said inorganic alkali metal salt with said first solution to form a second solution including cations from said quaternary salt and anions from said inorganic alkali metal salt in said liquid organic material; wherein said alkali metal salt is selected from the group consisting of sodium chromate, sodium dichromate and potassium chromate.

2. A method as recited in claim 1 wherein:
   the ratio in parts by weight of said inorganic salt to said quaternary salt is at least 1:10; and
   said organic material is present in an effective amount sufficient to dissolve said quaternary salt.

3. A method as recited in claim 1 wherein said organic material comprises a liquid selected from the group consisting of nonpolar organic liquids and low polar organic liquids.

4. A method as recited in claim 1 wherein said quaternary salt comprises methyltrialkyl ($C_8$–$C_{10}$) ammonium chloride.

5. A method as recited in claim 1 wherein:
   said quaternary salt comprises tetra-n-butylammonium iodide; and said organic material comprises chloroform.

6. A method as recited in claim 1 wherein:
   said quaternary salt is selected from the group consisting of methyltrialkyl ($C_8$–$C_{10}$) ammonium chloride, benzyltriethylammonium bromide, and benzyltriethylammonium chloride; and
   said organic material comprises a chlorinated organic liquid.

7. A method as recited in claim 6 wherein said organic material is selected from the group consisting of chloroform and methylene dichloride.

8. A solution, comprising:
   a liquid organic material containing, in solution, cations from an organo substituted quaternary ammonium salt, and anions from an inorganic alkali metal salt selected from the group consisting of sodium chromate, sodium dichromate and potassium chromate.

9. A solution as recited in claim 8 wherein said organic material comprises a liquid selected from the group consisting of nonpolar organic liquids and low polar organic liquids.

10. A solution as recited in claim 8 wherein said quaternary salt comprises methyltrialkyl ($C_8$–$C_{10}$) ammonium chloride.

11. A solution as recited in claim 8 wherein:
    said quaternary salt comprises tetra-n-butylammonium iodide; and said organic material comprises chloroform.

12. A solution as recited in claim 8 wherein:
    said quaternary salt is selected from the group consisting of methyltrialkyl ($C_8$–$C_{10}$) ammonium chloride, benzyltriethylammonium bromide, and benzyltriethylammonium chloride; and
    said organic material comprises a chlorinated organic liquid.

13. A solution as recited in claim 12 wherein said organic material is selected from the group consisting of chloroform and methylene dichloride.

* * * * *